(12) United States Patent
Tsuei

(10) Patent No.: US 8,989,819 B2
(45) Date of Patent: *Mar. 24, 2015

(54) HANDHELD ELECTRONIC DEVICE AND SAVING NUMBER METHOD AND DIGITAL STORAGE MEDIA

(71) Applicant: HTC Corporation, Taoyuan, Taoyuan County (TW)

(72) Inventor: Yuan-Mao Tsuei, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,223

(22) Filed: Jun. 24, 2014

(65) Prior Publication Data

US 2014/0308993 A1    Oct. 16, 2014

Related U.S. Application Data

(63) Continuation of application No. 12/416,239, filed on Apr. 1, 2009, now Pat. No. 8,787,890.

(30) Foreign Application Priority Data

Apr. 23, 2008    (TW) .............................. 97114819 A

(51) Int. Cl.
   *H04B 1/38*        (2006.01)
   *H04M 1/725*       (2006.01)
   *H04M 1/2745*      (2006.01)

(52) U.S. Cl.
   CPC .... *H04M 1/72569* (2013.01); *H04M 1/274558* (2013.01); *H04M 1/72522* (2013.01)
   USPC ........ 455/566; 455/433; 455/412.1; 455/439; 455/456.1; 455/457; 455/524; 455/418; 455/414.1; 455/415; 455/417; 455/425; 455/461; 455/550.1; 455/556.1

(58) Field of Classification Search
   USPC ........... 455/433, 412.1, 439, 456.1, 457, 524, 455/418, 414.1, 415, 417, 425, 461, 550.1, 455/556.1; 463/20, 16, 7, 30, 10, 25, 43, 22
   See application file for complete search history.

(56) References Cited

U.S. PATENT DOCUMENTS

| 6,035,220 A | 3/2000 | Claudio et al. |
| 7,072,460 B2 | 7/2006 | Wong et al. |

(Continued)

FOREIGN PATENT DOCUMENTS

| CN | 1738329 | 2/2006 |
| CN | 1933505 | 3/2007 |
| GB | 2402299 | 12/2004 |

OTHER PUBLICATIONS

Chinese Language Office Action dated Feb. 11, 2011.

(Continued)

*Primary Examiner* — Joseph Arevalo
(74) *Attorney, Agent, or Firm* — Birch, Stewart, Kolasch & Birch, LLP

(57) ABSTRACT

A method for saving number applied to a handheld electronic device is provided. In the method, in response to determining that the total number of digits of a entered number reaches the predetermined minimum number and the entered number does not correspond to a part of any one of one or more contact data, a save button is displayed on the screen for saving the entered number after the save button is triggered, a save button is shown on the screen, and the entered number is saved after the save button is triggered.

15 Claims, 3 Drawing Sheets

(56) References Cited

U.S. PATENT DOCUMENTS

| | | |
|---|---|---|
| 2004/0052355 A1 | 3/2004 | Awada et al. |
| 2005/0079895 A1 | 4/2005 | Kalenius et al. |
| 2006/0205432 A1 | 9/2006 | Hawkins et al. |
| 2008/0122796 A1 | 5/2008 | Jobs et al. |

OTHER PUBLICATIONS

English Language Translation of abstract of CN 1738329 (published Feb. 22, 2006).

English Language translation of abstract of CN 1933505 (published Mar. 21, 2007).

HANDHELD ELECTRONIC DEVICE AND SAVING NUMBER METHOD AND DIGITAL STORAGE MEDIA

CROSS-REFERENCE TO RELATED APPLICATIONS

This application is a Continuation application of co-pending application Ser. No. 12/416,239 filed on Apr. 1, 2009. Application Ser. No. 12/416,239 claims priority to Application No. 97114819 filed in Taiwan on Apr. 23, 2008 under 35 U.S.C. §119(a). The entire contents of all are hereby incorporated by reference.

BACKGROUND OF THE APPLICATION

Along with the advance in science and technology, handheld electronic products such as smartphone, touch phone, and personal digital assistant (PDA) phone are getting more and more popular. In addition to providing new functions, the manufacturers are dedicated to making the operating interface more user-friendly, more intuitive and simpler.

Most of the current PDA phones have the function of saving telephone number for a contact in the contact list of the telephone book. When the user would like to dial or input a new telephone number not saved in the contact list as a new contact data, the user has to activate a function menu and select "save to contacts" to save the new contact data. However, such operation method is very complicated and inconvenient to the user.

SUMMARY OF THE APPLICATION

The application is directed to a handheld electronic device and a method for saving telephone number and a digital storage medium. If the entered number has not been saved, a save button is instantly shown on the screen. Thus, the user can directly press the save button shown on the screen to save the entered number without using the complicated operation method, so as to improve the efficiency of saving telephone number.

According to a first aspect of the present application, a handheld electronic device is provided. The device comprises a screen, a storage unit, and a processing unit. The screen displays an entered number. The storage unit saves one or more saved numbers. The processing unit is coupled to the screen and the storage unit for determining whether the entered number is corresponding to one of the saved numbers. If the entered number is not corresponding to one of the saved numbers, the processing unit shows a save button on the screen for saving the entered number after the save button is triggered.

According to a second aspect of the present application, a method for saving number applied to a handheld electronic device is provided. The method comprises the following steps. An entered number is shown on a screen of the handheld electronic device. Whether the entered number is corresponding to one of saved numbers is determined. If the entered number is not corresponding to one of the saved numbers, a save button is shown on the screen for saving the entered number after the save button is triggered.

According to a third aspect of the present application, a digital storage medium is provided. The digital storage medium has many commands executable on a handheld electronic device, and the handheld electronic device executes a method for saving number after executing these commands. The method for saving number comprises following steps. An entered number is shown on a screen of the handheld electronic device. Whether the entered number is one of saved numbers is determined. If the entered number is not corresponding to one of the saved numbers, a save button is shown on the screen for saving the entered number after the save button is triggered.

The application will become apparent from the following detailed description of the preferred but non-limiting embodiments. The following description is made with reference to the accompanying drawings.

DETAILED DESCRIPTION OF THE ILLUSTRATED EMBODIMENTS

Figure 1:
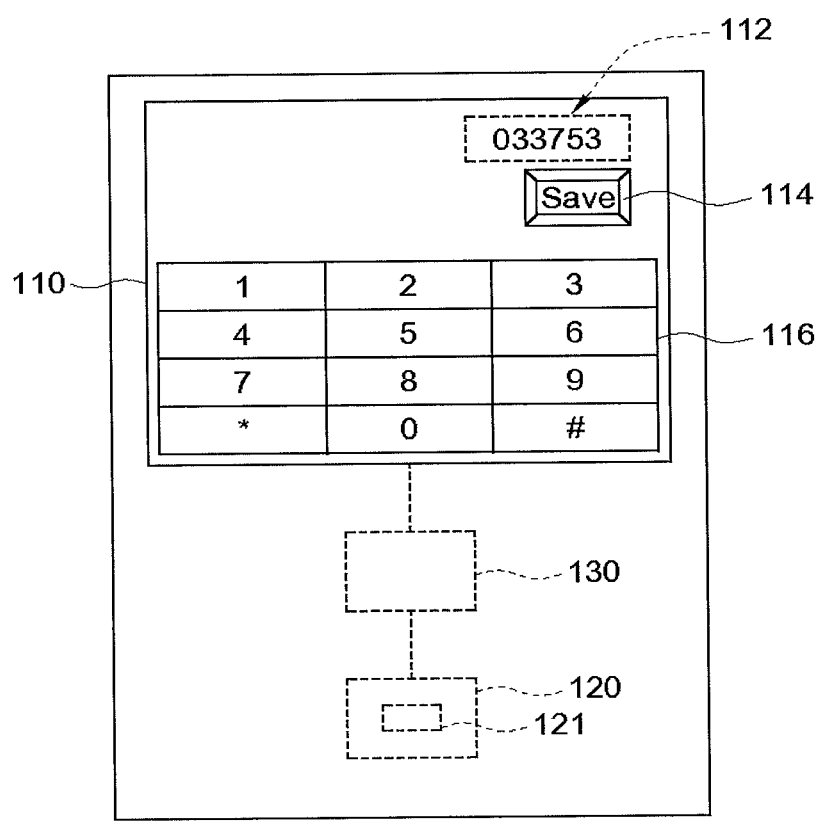
FIG. 1 shows a diagram of a handheld electronic device according to a preferred embodiment of the application.

Referring to FIG. 1, a diagram of a handheld electronic device according to an embodiment of the application is shown. The handheld electronic device 100, such as a smartphone, a touch phone, or a personal digital assistant (PDA) phone, comprises a screen 110, a storage unit 120, and a processing unit 130. The screen 110 displays an entered number 112, for example "033753." The storage unit 120 saves one or more saved numbers 121. The processing unit 130 is coupled to the screen 110 and the storage unit 120 for determining whether the entered number 112 is corresponding to one of the saved numbers 121. If the entered number 112 is not corresponding to one of the saved numbers 121, the processing unit 130 displays a save button 114 on the screen 110 for saving the entered number 112 after the save button 114 is triggered.

If the entered number 112 inputted by the user has not been saved, a save button 114 is instantly shown on the screen 110, such that the user can directly trigger the save button 114 to save the entered number 112 without using a complicated operation method.

In the present embodiment of the application, the screen 110 can be implemented by a touch screen used for displaying a keypad 116 via which the entered number 112 is inputted by a user. In another embodiment, the handheld electronic device 100 further comprises a physical keypad via which the entered number 112 is inputted by a user.

Furthermore, in the present embodiment, the user may directly click the save button 114 on the screen 110 to trigger the save button 114 to save the entered number 112. In another embodiment, the user may use a physical button corresponding to the save button 114 to trigger the save button 114. After the save button 114 is triggered, the processing unit 130 activates a number saving function to save the entered number 112.

The storage unit 120, which can be implemented by a read only memory (ROM), an additional memory card, or a subscriber identity module (SIM) card, comprises a contact list. The saved numbers 121 are corresponding to the contact data in the contact list. After the save button 114 is triggered, the processing unit 130 saves the entered number 112 as a new data of a contact in the contact list, wherein the contact data is a new contact data or a contact data previously saved in the contact list.

Generally, a telephone number will be considered as an effective telephone number when the units of digital numbers of the telephone number reach predetermined units of digital numbers, for example six units of digital numbers. In one embodiment, the processing unit 130 further determines whether the units of digital numbers of the entered number 112 reach predetermined units of digital numbers. If the processing unit 130 determines that the entered number 112 is not corresponding to one of the saved numbers 121 and the units of digital numbers of the entered number 112 reach the predetermined units of digital numbers, the processing unit 130 displays the save button 114 on the screen 110. If the processing unit 130 determines that the entered number 112 is not corresponding to one of the saved numbers 121 but the units of digital numbers of the entered number 112 are less than the predetermined units of digital numbers, the processing unit 130 does not display the save button 114 on the screen 110.

In another embodiment, after the processing unit 130 displays the save button 114 on the screen 110, the processing unit 130 further determines whether the units of digital numbers of the entered number 112 increase. If the processing unit 130 determines that the units of digital numbers of the entered number 112 increase and the entered number 112 is corresponding to one of the saved numbers 121, the processing unit 130 does not display the save button 114 on the screen 110.

For example, one of the saved numbers 121 is "033753252" and the number inputted by the user is "033753," the processing unit 130 determines that the units of the digital numbers of the entered number 112 "033753" reach predetermined six units of digital numbers and the entered number 112 "033753" neither matches "033753252" nor matches any one of the other saved numbers 121, and then the processing unit 130 displays the save button 114 on the screen 110. However, when the user continues to input the number as "033753252," the processing unit 130 further determines that the entered number 112 "033753252" matches the saved number 121 "033753252." Meanwhile, the processing unit 130 does not display the save button 114 on the screen 110.

In the above embodiments, the predetermined units of digital numbers for the telephone number are six units of digital numbers, but the application is not limited thereto.

In yet another embodiment, what differs with the above embodiments is that whether the entered number 112 is corresponding to one of the saved numbers 121 is determined according to whether the entered number 112 matches a part of the saved number 121, wherein the part is, for example, the initial part, the middle part, or the final part of the saved number 121. If it is matched, the processing unit 130 does not display the save button 114 on the screen 110 even though the units of the digital numbers of the entered number 112 reach or exceed the predetermined units of digital numbers; if it is not matched, the processing unit 130 displays the save button 114 on the screen 110.

For example, one of the saved numbers 121 is "033753252" and the number inputted by the user is "033753," the processing unit 130 determines that the entered number 112 "033753" matches a part of the saved number 121 "033753252." Even though the units of the digital numbers of the entered number 112 "033753" reach the predetermined six units of digital numbers, the processing unit 130 does not display the save button 114 on the screen 110. When the user continues to input the number as, for example, "0337539," the processing unit 130 further determines that the entered number 112 "0337539" does not match the saved number 121 "033753252", and the units of the digital numbers of the entered number 112 "0337539" reach and exceed the predetermined six units of digital numbers, and then the processing unit 130 displays the save button 114 on the screen 110.

Figure 2:
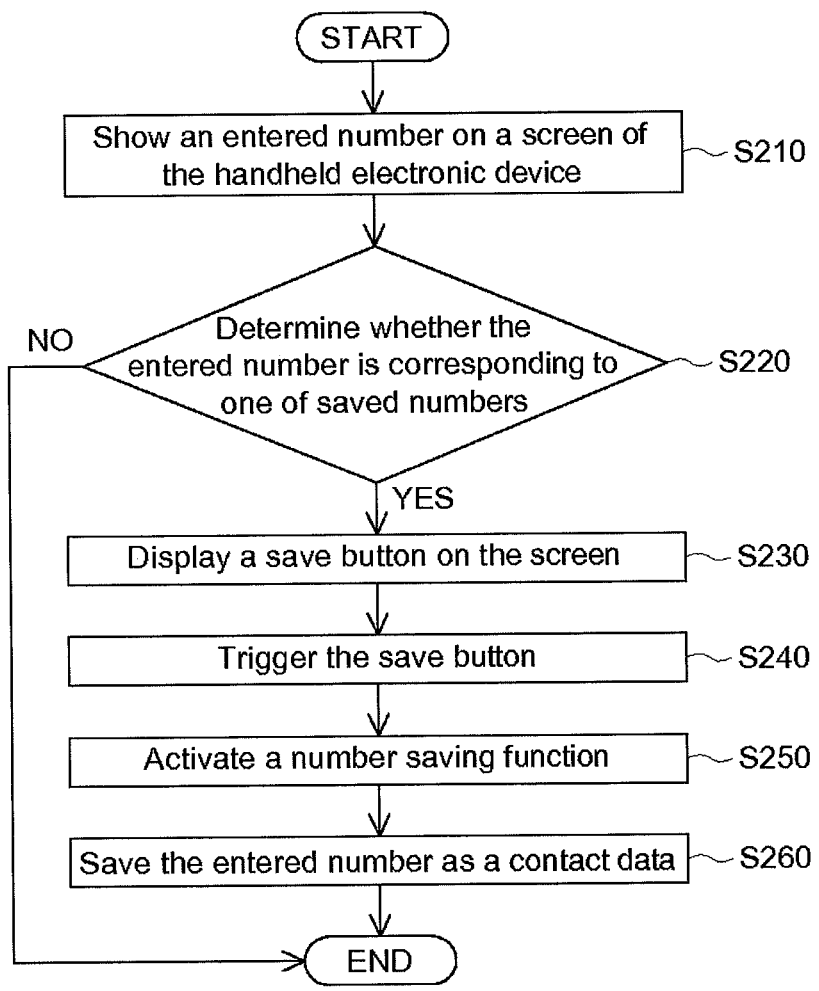
FIG. 2 shows an example of a flowchart of a method for saving number according to a preferred embodiment of the application.

Referring to FIG. 2, an example of a flowchart of a method for saving number according to an embodiment of the application is shown. Firstly, the method begins at step S210, the entered number 112 is shown on the screen 110 of the handheld electronic device 100. The entered number 112, for example, is the number "033753" inputted by the user by pressing the keypad 116.

Then, the method proceeds to step S220, the processing unit 130 determines whether the entered number 112 is corresponding to one of the saved numbers 121 saved in the storage unit 120. The saved numbers 121, for example, are data corresponding to a contact in a contact list.

In step S220, the method proceeds to step S230 if the entered number 112 is not corresponding to one of the saved numbers 121; or the method terminates if the entered number 112 is corresponding to one of the saved numbers 121.

Afterwards, the method proceeds to step S230, the processing unit 130 displays the save button 114 on the screen 110 for the user to save the entered number 112 by pressing the save button.

Next, the method proceeds to step S240, the save button 114 is triggered. The user can directly click the save button 114 on the screen 110 to trigger the save button 114; or the user can use a physical button corresponding to the save button 114 to trigger the save button 114.

Then, the method proceeds to step S250, the processing unit 130 activates a number saving function. After that, the method proceeds to step S260, the processing unit 130 saves the entered number 112 as a contact data.

Figure 3:
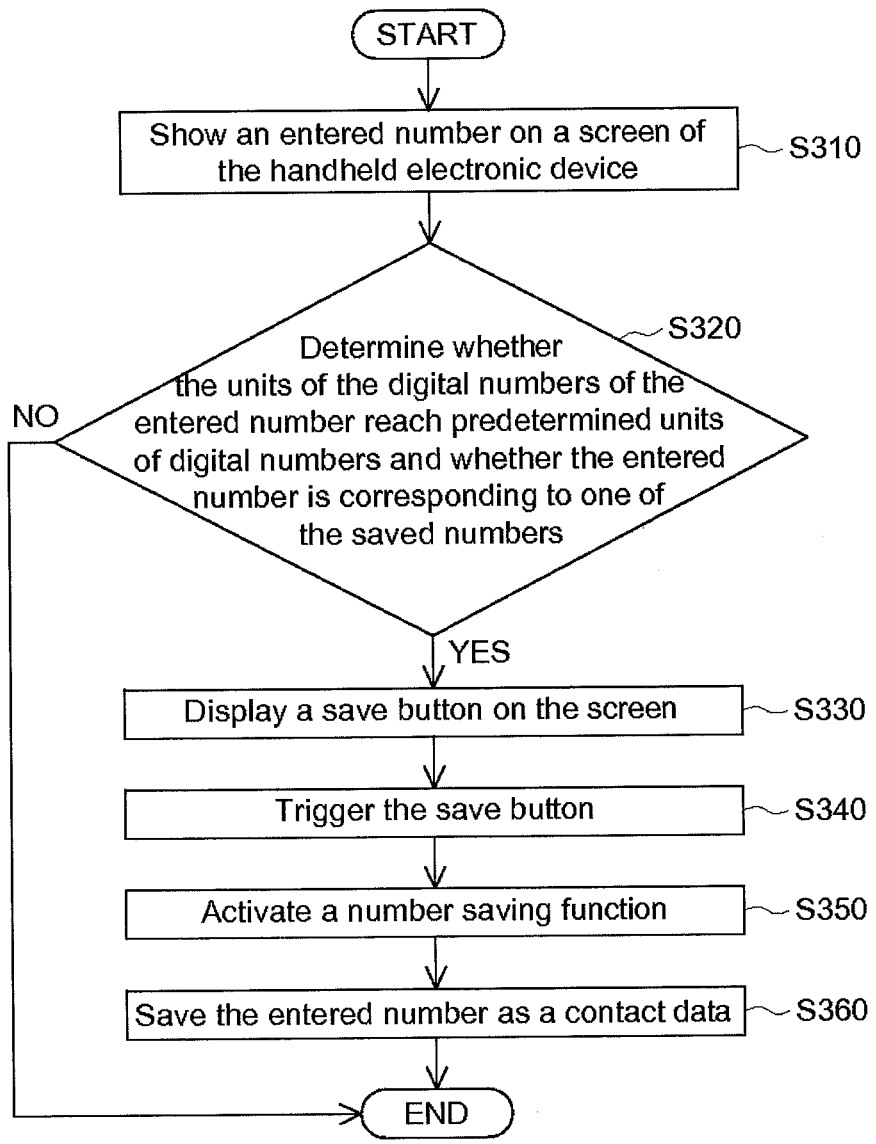
FIG. 3 shows another example of a flowchart of a method for saving number according to a preferred embodiment of the application.

Referring to FIG. 3, another example of a flowchart of a method for saving number according to an embodiment of the application. Firstly, the method begins at step S310, the entered number 112, for example the number "033753," is shown on the screen 110 of the handheld electronic device 100.

Then, the method proceeds to step S320, the processing unit 130 determines whether the units of the digital numbers of the entered number 112 reach predetermined units of digital numbers, and determines whether the entered number 112 is corresponding to one of the saved numbers 121. The predetermined units of digital numbers, for example, are six units of digital numbers.

In step S320, if the units of the digital numbers of the entered number 112 reach the predetermined units of digital numbers and the entered number 112 is not corresponding to one of the saved numbers 121, then the method proceeds to step S330; otherwise, the method terminates.

Afterwards, the method proceeds to step S330, the processing unit 130 displays the save button 114 on the screen 110. Next, the method proceeds to step S340, the save button 114 is triggered. Then, the method proceeds to step S350, the processing unit 130 activates a number saving function. After that, the method proceeds to step S360, the processing unit 130 saves the entered number 112 as a contact data.

In another embodiment, after the step S330 of displaying the save button 114 on the screen 110, the processing unit 130 further determines whether the units of the digital numbers of the entered number 112 increase. If the processing unit 130 determines that the units of the digital numbers of the entered number 112 increase and the entered number 112 is corresponding to one of the saved numbers 121, the processing unit 130 does not display the save button 114 on the screen 110.

In yet another embodiment, what differs with the above embodiments is that whether the entered number 112 is corresponding to one of the saved numbers 121 is determined according to whether the entered number 112 matches a part of the saved number 121, wherein the part is, for example, the initial part, the middle part, or the final part of the saved number 121. If it is matched, the processing unit 130 does not display the save button 114 on the screen 110 even though the units of the digital numbers of the entered number 112 reach or exceed the predetermined units of digital numbers; if it is not matched, the processing unit 130 displays the save button 114 on the screen 110.

According to the method for saving number of the present embodiment of the application, each step of FIG. 2 and FIG. 3 is implemented by the handheld electronic device 100 of FIG. 1, but the application is not limited thereto. Anyone who is skilled in the technology of the application will understand that the procedures and sequence of the method for saving number can be modified or adjusted to fit actual needs.

The method for saving number can be programmed and stored in a digital data storage medium executable on the handheld electronic device 100. The digital data storage medium, such as secure digital (SD) card, memory stick (MS), and multimedia memory card (MMC), has the above number saving function after the method for saving number is executed on the handheld electronic device 100.

According to the handheld electronic device and the method for saving number and the digital storage medium thereof disclosed in the above embodiments of the application, a save button is instantly shown on the screen if the entered number has not been saved. The user can directly trigger the save button to save the entered number without using a complicated operation method. The application provides the user with more user-friendly and intuitive operating interface which increases efficiency of number saving and user convenience. Also, the application enables the user to have a better experience of use and enhances product competitiveness.

While the application has been described by way of example and in terms of an embodiment, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A handheld electronic device, comprising:
a screen configured to display an entered number;
a storage unit configured to save one or more contact data; and
a processing unit coupled to the screen and the storage unit and configured to determine whether the entered number corresponds to a part of any one of the one or more contact data and to determine whether a total number of digits of the entered number reaches a predetermined minimum value;
wherein the predetermined minimum value is less than a maximum number of digits corresponding to the one or more contact data,
wherein in response to determining that the total number of digits of the entered number reaches the predetermined minimum number and the entered number does not correspond to a part of any one of the one or more contact data, the processing unit displays a save button on the screen for saving the entered number after the save button is triggered; otherwise, the processing unit does not display the save button on the screen, and
wherein the processing unit is configured to save the entered number to a new contact data in a contact list or to one of the one or more contact data that is previously saved in the contact list after the save button is triggered.

2. The handheld electronic device according to claim 1, wherein the one or more contact data is one or more saved numbers.

3. The handheld electronic device according to claim 2, wherein the part of one of the one or more contact data comprises an initial part, a middle part, or a final part of one of the one or more saved numbers.

4. The handheld electronic device according to claim 1, wherein the processing unit activates a number saving function for saving the entered number after the save button is triggered.

5. The handheld electronic device according to claim 1, wherein the screen is a touch screen, and the touch screen is configured to display a keypad for inputting the entered number.

6. The handheld electronic device according to claim 1, further comprising a physical keypad for inputting the entered number.

7. The handheld electronic device according to claim 1, further comprising a physical button for activating the save button.

8. A method for saving number, applied to a handheld electronic device, the method comprising:
displaying an entered number on a screen of the handheld electronic device;
determining whether the entered number corresponds to a part of any one of one or more contact data;
determining whether a total number of digits of the entered number reaches a predetermined minimum value, wherein the predetermined minimum value is less than a maximum number of digits corresponding to the one or more contact data; and
displaying a save button on the screen in response to determining that the total number of digits of the entered number reaches the predetermined minimum value and the entered number does not correspond to a part of any one of the one or more contact data; otherwise, the processing unit does not display the save button on the screen, wherein the save button is for saving the entered number after the save button is triggered, and wherein the entered number is saved to a new contact data in a contact list or saved to one of the one or more contact data that is previously saved in the contact list after the save button is triggered.

9. The method for saving number according to claim 8, wherein after the save button is triggered, further comprising:
activating a number saving function for saving the entered number.

10. A non-transitory storage medium having a plurality of commands executable on a handheld electronic device for executing the method for saving number according to claim 8 after the handheld electronic device executes the plurality of commands.

11. The method for saving number according to claim 8, wherein the one or more contact data is one or more saved numbers.

12. The method for saving number according to claim 11, wherein the part of one of the one or more contact data comprises an initial part, a middle part, or a final part of one of the one or more saved numbers.

13. The method for saving number according to claim 8, wherein the screen is a touch screen, and the entered number is inputted via a keypad displayed on the touch screen.

14. The method for saving number according to claim 8, wherein the entered number is inputted by a physical keypad.

15. The method for saving number according to claim 8, wherein the save button is triggered in response to activating a physical button.

\* \* \* \* \*